United States Patent
Kawachiya et al.

(10) Patent No.: US 9,808,722 B2
(45) Date of Patent: *Nov. 7, 2017

(54) DETERMINING WHETHER OBJECT IS GENUINE OR FAKE IN METAVERSE

(75) Inventors: Kiyokuni Kawachiya, Kanagawa-ken (JP); Michiaki Tatsubori, Kanagawa-ken (JP)

(73) Assignee: Activision Publishing, Inc., Santa Monica, CA (US)

(*) Notice: Subject to any disclaimer, the term of this patent is extended or adjusted under 35 U.S.C. 154(b) by 1075 days.

This patent is subject to a terminal disclaimer.

(21) Appl. No.: 13/533,359

(22) Filed: Jun. 26, 2012

(65) Prior Publication Data

US 2012/0266256 A1 Oct. 18, 2012

Related U.S. Application Data

(63) Continuation of application No. 12/399,349, filed on Mar. 6, 2009, now Pat. No. 8,230,045.

(30) Foreign Application Priority Data

Mar. 7, 2008 (JP) .................................. 2008-058489

(51) Int. Cl.
*G06F 15/16* (2006.01)
*A63F 13/75* (2014.01)
(Continued)

(52) U.S. Cl.
CPC .............. *A63F 13/75* (2014.09); *A63F 13/12* (2013.01); *A63F 13/71* (2014.09); *G06F 21/64* (2013.01);
(Continued)

(58) Field of Classification Search
CPC ........ G06N 3/006; G06N 5/025; A63F 13/00; A63F 13/75; A63F 13/71; H04L 67/1095;
(Continued)

(56) References Cited

U.S. PATENT DOCUMENTS 6,119,229 A * 9/2000 Martinez et al. ................ 726/28
6,135,646 A * 10/2000 Kahn ....................... G06F 21/10
707/999.104
(Continued)

FOREIGN PATENT DOCUMENTS

CN 1858757 A * 11/2006 ............. G06F 19/00
EP 0969430 A1 * 1/2000 ............. G07F 19/00
(Continued)

*Primary Examiner* — Anthony Mejia
*Assistant Examiner* — Kristoffer S Sayoc
(74) *Attorney, Agent, or Firm* — Novel IP

(57) ABSTRACT

A server computer is connected to a plurality of client computers through a network, and controls objects in a Metaverse accessed by the client computers. The server computer includes a storage unit for storing an object ID specifying an object accessible in the Metaverse by the plurality of client computers and authenticity information associated with the object ID. The authenticity information indicates that the object is genuine. The server computer also includes a communication unit for communicating with each of the client computers. The server computer also includes an enquiry unit for causing the communication unit to transmit the authenticity information corresponding to the object ID to at least one of the plurality of client computers upon receipt of an enquiry request to enquire about the object ID of the object from one of the plurality of client computers.

11 Claims, 16 Drawing Sheets

(51) Int. Cl.
 *A63F 13/71* (2014.01)
 *A63F 13/30* (2014.01)
 *G06F 21/64* (2013.01)
 *G06N 3/00* (2006.01)

(52) U.S. Cl.
 CPC ...... *G06N 3/006* (2013.01); *A63F 2300/5586* (2013.01); *A63F 2300/575* (2013.01)

(58) Field of Classification Search
 CPC ... H04L 67/2852; G06F 21/6209; G06F 21/64
 USPC ............................................ 726/26; 709/203
 See application file for complete search history.

(56) References Cited

U.S. PATENT DOCUMENTS

| | | | |
|---|---|---|---|
| 6,810,418 B1 | 10/2004 | Shah et al. | |
| 6,954,728 B1 | 10/2005 | Kusumoto et al. | |
| 7,249,139 B2 | 7/2007 | Chuah et al. | |
| 7,797,168 B2 | 9/2010 | Kusumoto et al. | |
| 7,996,264 B2 | 8/2011 | Kusumoto et al. | |
| 2003/0014423 A1* | 1/2003 | Chuah et al. | 707/102 |
| 2004/0030888 A1* | 2/2004 | Roh et al. | 713/156 |
| 2004/0243664 A1 | 12/2004 | Horstemeyer | |
| 2005/0182729 A1 | 8/2005 | Kananen | |
| 2005/0216346 A1 | 9/2005 | Kusumoto et al. | |
| 2005/0216361 A1* | 9/2005 | Fukada | 705/26 |
| 2006/0161788 A1 | 7/2006 | Turpin et al. | |
| 2007/0050716 A1* | 3/2007 | Leahy et al. | 715/706 |
| 2008/0014917 A1 | 1/2008 | Rhoads et al. | |
| 2008/0220876 A1 | 9/2008 | Mehta et al. | |
| 2008/0282090 A1 | 11/2008 | Leybovich | |
| 2009/0030774 A1 | 1/2009 | Rothschild et al. | |
| 2009/0063283 A1 | 3/2009 | Kusumoto et al. | |
| 2009/0157495 A1 | 6/2009 | Cahuzac et al. | |
| 2009/0157625 A1 | 6/2009 | Jung et al. | |
| 2009/0228550 A1 | 9/2009 | Kawachiya et al. | |
| 2009/0234948 A1 | 9/2009 | Garbow et al. | |
| 2009/0235191 A1 | 9/2009 | Garbow et al. | |
| 2010/0169798 A1* | 7/2010 | Hyndman et al. | 715/757 |
| 2010/0293569 A1 | 11/2010 | Kusumoto et al. | |
| 2011/0107433 A1 | 5/2011 | Steelberg et al. | |
| 2011/0126272 A1 | 5/2011 | Betzler et al. | |

FOREIGN PATENT DOCUMENTS

| | | |
|---|---|---|
| JP | 2005050081 | 2/2005 |
| JP | 2005234633 | 9/2005 |

* cited by examiner

| OBJECT ID | FORM DATA | OBJECT OWNER | HISTORY INFORMATION | BRAND ID |

| BRAND ID | BRAND MANAGER | BRAND NAME | LOGO |
|---|---|---|---|

FIG. 4

| BRAND ID | BRAND MANAGER | BRAND NAME | LOGO |
|---|---|---|---|
| 201 | USER A | A | A LOGO |

FIG. 7

| OBJECT ID | FORM DATA | OBJECT OWNER | HISTORY INFORMATION | BRAND ID |
|---|---|---|---|---|
| 101 | D(101) | USER A | created by A | null |

| OBJECT ID | FORM DATA | OBJECT OWNER | HISTORY INFORMATION | BRAND ID |
|---|---|---|---|---|
| 101 | D(101) | USER A | created by A | 201 |

| OBJECT ID | FORM DATA | OBJECT OWNER | HISTORY INFORMATION | BRAND ID |
|---|---|---|---|---|
| 101 | D(101) | USER A | created by A | 201 |

⇩

| OBJECT ID | FORM DATA | OBJECT OWNER | HISTORY INFORMATION | BRAND ID |
|---|---|---|---|---|
| 101 | D(101) | USER B | created by A | 201 |
| | | | given to B | |

FIG. 11

| OBJECT ID | FORM DATA | OBJECT OWNER | HISTORY INFORMATION | BRAND ID |
|---|---|---|---|---|
| 101 | D(101) | USER A | created by A | 201 |

| OBJECT ID | FORM DATA | OBJECT OWNER | HISTORY INFORMATION | BRAND ID |
|---|---|---|---|---|
| 101 | D(101) | USER B | created by A / given to B | 201 |
| 102 | D(101) | USER B | copied from ID (101) | null |
| 103 | D(103) | USER B | modified from ID (101) | null |
| 104 | D(104) | USER B | created by B | null |

| CORPORATE ID | EMPLOYEE ID OWNER | COMPANY NAME | LOGO |
|---|---|---|---|

FIG. 17

| EVENT ID | EVENT MANAGER | EVENT NAME | LOGO | TIME PERIOD INFORMATION |
|---|---|---|---|---|

FIG. 18

DETERMINING WHETHER OBJECT IS GENUINE OR FAKE IN METAVERSE

CROSS REFERENCE TO RELATED APPLICATION

This application is a continuation of U.S. patent application Ser. No. 12/399,349, filed Mar. 6, 2009 (which issued as U.S. Pat. No. 8,230,045on Jul. 24, 2012), which claims priority to Japanese Patent Application 2008-58489, the disclosure of which is incorporated by reference herein in its entirety.

BACKGROUND

The present embodiments relates to a technique for determining whether an object is genuine or fake in a Metaverse.

In recent years, the number of users of Metaverses has been expanding rapidly. A Metaverse is a three-dimensional virtual world formed as electronic data, such as a virtual world or a massively-multiplayer online role-playing game (MMORPG). In some recent types of Metaverses, users are allowed to generate objects freely. Generally, users can restrict copying and giving of generated objects. Due to the rareness of these objects, objects, such as avatar clothing and game items, are purchased and sold (by use of virtual world currency or real world currency) in Metaverses. For examples of conventional techniques relating to Metaverses, see Japanese Patent Application Publication Nos. 2005-50081 and 2005-234633.

However, since the objects are pieces of electronic data, unauthorized copies or the like are made in some cases. For example, a malicious user may make a copy of an object existing in a Metaverse in a certain place outside the Metaverse (such as in a storage device in the real world), and bring back the copied object to the Metaverse pretending that the object is an original. Such copying becomes a serious problem particularly in the case where it is important to determine whether the object is genuine or fake (for example, where the object is a luxury brand item or an employee badge in the Metaverse). With the increase in the number of users and contents in Metaverses in the future, it may become increasingly important to be able to determine whether an object is genuine or fake, in order to maintain and improve brand images as well as to assure company security, for example. On the other hand, excessive restriction on users generating objects in Metaverses and on users bringing in objects from outside may inhibit free activities of users, which spoils the merits and pleasure of the Metaverses. The present embodiments are provided in view of such technical problems, and one object thereof is to provide means for determining whether an object is genuine or fake with a simple system configuration, while assuring users in the Metaverse to freely generate objects and to bring in objects from outside the Metaverse.

SUMMARY

The present embodiments include a server computer connected to a plurality of client computers through a network, and controls objects in a Metaverse accessed by the client computers. The server computer includes a storage unit for storing an object ID specifying an object accessible in the Metaverse by the plurality of client computers and authenticity information associated with the object ID. The authenticity information indicates that the object is genuine. The server computer also includes a communication unit for communicating with each of the client computers. The server computer also includes an enquiry unit for causing the communication unit to transmit the authenticity information corresponding to the object ID to at least one of the plurality of client computers upon receipt of an enquiry request to enquire about the object ID of the object from one of the plurality of client computers.

The present embodiments also include a method including storing in a server computer an object ID specifying an object in a Metaverse accessible by a plurality of client computers and authenticity information associated with the object ID, the authenticity information indicating that the object is genuine. The method includes receiving, by the server computer, from one of the plurality of client computers an enquiry request including the object ID to enquire about the object. The method further includes transmitting, by the server computer, the authenticity information corresponding to the object ID to the client computer, the server computer maintaining the authenticity information stored in the server computer.

The present embodiments also include a computer readable tangible medium incorporating a sequence of program instructions that when implemented, will cause a computer to perform a method including storing in a server computer an object ID specifying an object in a Metaverse accessible by a plurality of client computers and authenticity information associated with the object ID, the authenticity information indicating that the object is genuine. The method includes receiving, by the server computer, from one of the plurality of client computers an enquiry request including the object ID to enquire about the object. The method further includes transmitting, by the server computer, the authenticity information corresponding to the object ID to the client computer, the server computer maintaining the authenticity information stored in the server computer.

BRIEF DESCRIPTION OF THE SEVERAL VIEWS OF THE DRAWINGS

For a more complete understanding of the present embodiments and the advantages thereof, reference is now made to the following description taken in conjunction with the accompanying drawings.

FIG. 4 is a schematic view illustrating the data structure of a management database 12 according to Example 1.

FIG. 7 is a schematic view of the management database 12 in a state where a new entry is registered.

FIG. 11 is a schematic view of the object database 11 before and after the object giving.

FIG. 17 is a schematic view of the data structure of a management database 12 according to Example 2.

FIG. 18 is a schematic view of the data structure of a management database 12 according to Example 3.

DETAILED DESCRIPTION

Figure 1:
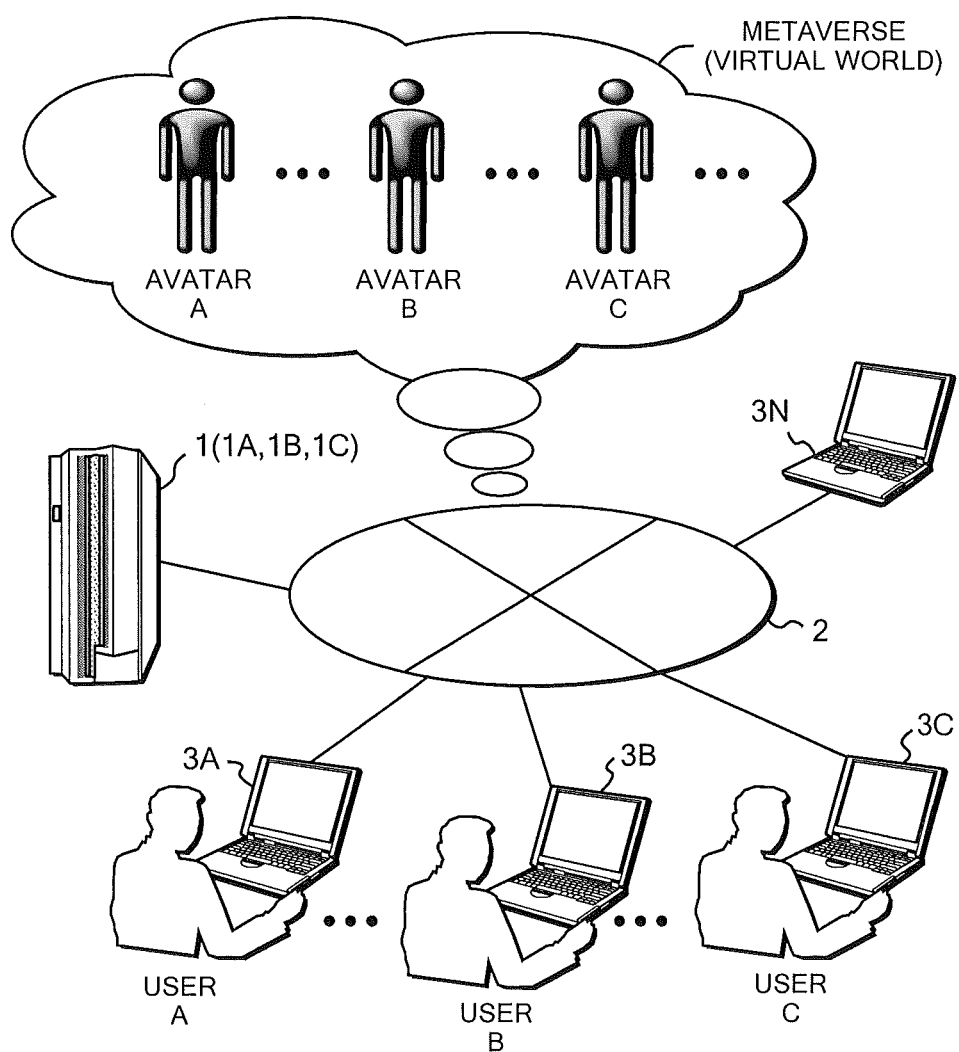
FIG. 1 is a schematic view of an embodiment of the present disclosure.

An enquiry request may be transmitted from a client computer to the server in response to an action of an avatar in the Metaverse. Specifically, first and second users access the Metaverse as first and second avatars, through first and second client computers, respectively, and the object is owned by the first avatar. The enquiry unit receives an enquiry request on condition that the second avatar makes an enquiry for the object in the Metaverse, and has authenticity information of the object transmitted to the second client computer (so as to be recognizable by the second avatar in the Metaverse), on condition that the authenticity information corresponding to the object ID is stored.

More specific application examples of this aspect include cases where the object is a luxury brand product and where the object is an employee badge. That is, the object is an accessory object for avatars in the Metaverse; and the authenticity information further includes manager information specifying a manager of the brand of the accessory object, a brand name indicating the name of the brand, and logo data indicating the logo of the brand. Moreover, upon receipt of an enquiry including an object ID to enquire about the object of the object ID from a certain client computer, the enquiry unit may have transmit, at least one of the manager information, the brand name, and the logo data corresponding to the object ID transmitted to the client computer, on condition that the authenticity information corresponding to the object ID is stored in the storage unit. The object may also be an employee badge object of an avatar in the Metaverse; and the authenticity information further includes owner information specifying an owner of the employee badge object, a company name indicating the name of the company, and logo data indicating the logo of the company. Moreover, upon receipt of an enquiry request including an object ID to enquire about the object of the object ID from a certain client computer, the enquiry unit may transmit at least one of the owner information, the company name, and the logo data corresponding to the object ID transmitted to the client computer, on condition that the authenticity information corresponding to the object ID is stored in the storage unit.

An expiration time of an object can be referred to as a condition of transmitting authenticity information. Specifically, the object information includes time period information indicating an expiration time of the authenticity information; and upon receipt of an enquiry request including an object ID to enquire about the object of the object ID from a certain client computer, the enquiry unit has authenticity information corresponding to the object ID transmitted to the client computer, on condition that the authenticity information corresponding to the object ID is stored in the storage unit and is still valid since its expiration time has not come yet. More specific application examples of this aspect include a case where the object is a ticket having the expiration time in the Metaverse.

In contrast, if authenticity information is not stored in the storage unit, the enquiry unit notifies the client computer of the fact. Specifically, upon receipt of an enquiry request including an object ID to enquire about the object of the object ID from a certain client computer, the enquiry unit has a notification that authenticity information is not stored transmitted to the client computer, on condition that the authenticity information corresponding to the object ID is not stored in the storage unit. The notification that the authenticity information is not stored is transmitted to the client computer which has transmitted the enquiry request. In addition, the notification may be configured to be transmitted also to a predetermined server or a client computer (such as an administrative server administrating the Metaverse).

The notification may be transmitted to a user who created the object (a user who created the object in the Metaverse or who brought the object in to the Metaverse). That is, the object information includes history information indicating at least any one of creation, copying, modification, and giving of the object; and the enquiry unit may specify an original user of the object according to the history information, and transmit a notification that the authenticity information is not stored to a client computer of the original user.

The object information may further separately include owner information specifying the owner of the object and manager information specifying the manager of the object. The authenticity information or the message indicating that the authenticity information is not stored may be transmitted according to the owner information and the manager information, to client computers of the owner and manager.

Processing for copying, modification and giving of an object in the Metaverse may be carried out in the following manner, for example. As for object copying, the object information includes form data of the object; and the server may further include an update unit which copies the form data of an object before the copying upon receipt of a copying request including an object ID to copy the object of the object ID from a certain client computer, and which invalidates authenticity information of the copied object and generates a new record in the storage unit. As for object modification, the object information further includes form data of the object; and the server may further include an update unit which modifies the form data of an object before the modification upon receipt of a modification request including an object ID to modify the object of the object ID from a certain client computer, and which invalidates authenticity information of the modified object and generates a new record in the storage unit. As for object creation, the object information further includes form data of the object; and the server may further include an update unit which registers form data of a new object upon receipt of a new object creation request including form data from a certain client computer, and which does not store authenticity information of the new object and generates a new record in the storage unit. As for object giving, the object is owned by a first user; and the object information further includes owner information specifying the owner of the object.

The server computer may further comprise an update unit which changes the owner information from the first user to a second user, upon receipt of a giving request to give the object from the first user to the second user including a corresponding object ID, and which does not change the authenticity information. Note that the object may be given from a first avatar to a second avatar, in the Metaverse to which the first and second users log in as the first and second avatars through the first and second client computers, respectively. In other words, authenticity information is not registered with object creation, existing authenticity information is invalidated with object copying or modification, and existing authenticity information is kept the same with object giving.

The registration and setting of authenticity information is carried out as follows in the case where the object is, for instance, a brand product. Specifically, the object is an accessory object for avatars in the Metaverse; and the authenticity information further includes manager information specifying a manager of the brand of the accessory object and a brand name indicating the name of the brand.

The server computer may further include a registration unit. Upon receipt of a brand registration request to register a certain user as a manager of a brand from a certain client computer, the registration unit registers, in the storage unit, the user as the manager of the brand and the brand name as the name of the brand, on condition that the same brand name is not already registered with another user assigned as the manager. Upon receipt of an accessory object registration request to register a certain accessory object as a genuine object from a certain client computer, the registration unit may register, in the storage unit, a corresponding object ID and authenticity information in association with each other as object information, on condition that the user of the client computer is registered as the manager of the brand. In the case where the object is an employee badge, the procedure is as follows. Specifically, the object is an employee badge object of an avatar in the Metaverse, and the authenticity information further includes owner information specifying an owner of the employee badge object and a company name indicating the name of the company.

The server computer may further include a registration unit. Upon receipt of an employee badge registration request to register a certain user as an owner of a certain employee badge object from a certain client computer, the registration unit registers, in the storage unit, the user as the owner of the employee badge object and the company name as the name of the company, on condition that the same company name is not already registered with another user assigned as the owner. Upon receipt of an employee badge object registration request to register a certain employee badge object as a genuine object from a certain client computer, the registration unit may register a corresponding object ID and authenticity information in association with each other as object information in the storage unit, when the user of the client computer is registered as the owner of the employee badge object.

Referring to FIG. 1, further details of the embodiments will be clear from a schematic view showing an embodiment of the present disclosure. As shown in FIG. 1, the Metaverse system is configured with multiple clients 3A to 3N including clients (client computers) 3A to 3C, a server (server computer) 1, and a network 2 connecting the clients 3A to 3N and the server 1. Although a personal computer is assumed as each of the clients 3A to 3N in the embodiment, the invention is not limited to this. A PDA, a mobile phone, a dedicated gaming machine, an appliance, or other similar devices may be employed instead. Although a PC server is assumed as the server 1 in the embodiment, the invention is not limited to this. A blade server, a large general-purpose computer, or the like may be also employed otherwise. Note that the server 1 may include multiple servers, each serving a corresponding function of the server 1. Examples of the servers provided in the server 1 are a login server 1A responsible for login of users to the Metaverse, an environment server 1B that provides a Metaverse environment for each avatar representing a corresponding user, and an object management server (server) 1C that manages objects in the Metaverse.

The servers for respective functions may be configured in grids of multiple servers. Although the Internet is assumed as the network 2 in the embodiment, networks such as an intranet, an extranet, or other networks, or a network including these networks may also be employed. As the platform of the Metaverse in which the users A to C participate as avatars A to C through the respective clients 3A to 3C, Second Life of Linden Lab of the United States, meet-me of Co-Core Inc. of Japan, HiPiHi World of HiPiHi Co., Ltd of China, Ultima Online of Origin Systems, Inc. of the United States, Lineage of NCsoft Corporation of Korea, or others may be used. Since system configurations of the login server 1A and the environment server 1B are already known, details thereof will be omitted here. The hardware and software configuration of the object management server 1C will be described later with reference to FIG. 19.

Figures 2, 3:
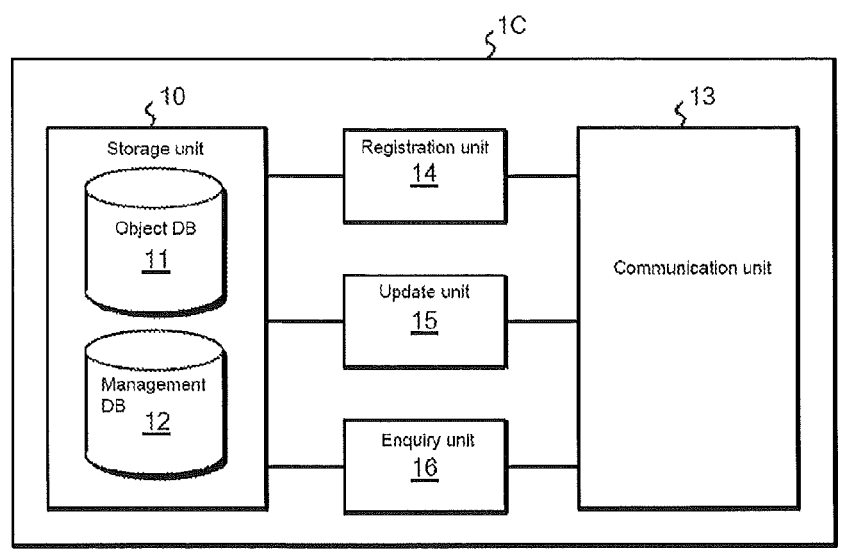
FIG. 2 is a functional block diagram illustrating the function of an object management server 1C according to the embodiment of the present disclosure.
FIG. 3 is a schematic view illustrating the data structure of an object database 11 according to Example 1.

FIG. 2 is a functional block diagram illustrating functions of the object management server 1C according to an embodiment of the present disclosure. The object management server 1C includes: a storage module (storage unit) 10 for storing object information and management information; a communication module (communication unit) 13 for communicating with the clients 3A to 3N through the network 2; a registration module (registration unit) 14 for newly registering information in the storage module 10; an update module (update unit) 15 for updating the information stored in the storage module 10; an enquiry module (enquiry unit) 16 for responding to enquiries on the basis of the information stored in the storage module 10. The storage module 10 further includes an object database 11 for storing object information, and a management database 12 for storing management information.

EXAMPLE 1

Hereinafter, as Example 1, a description will be given of a case of determining whether a bag object (accessory object), which is an object in the Metaverse, is genuine or fake.

FIG. 3 is a schematic view of the data structure of the object database 11 according to Example 1. As shown in FIG. 3, entries (records) in the object database 11 include: object IDs for specifying individual bag objects; 3D form data of bag objects in the Metaverse; object owner information for specifying the owners of the bag objects; history information indicating an update history of the bag objects; and brand IDs (authenticity information) each pointing to management information of the corresponding bag object. Meanwhile, FIG. 4 is a schematic view illustrating the data structure of the management database 12 according to Example 1. As shown in FIG. 4, entries (records) in the management database 12 include: brand IDs (authenticity information) for specifying the brands; manager information (authenticity information) for specifying the manager of each brand; names of the brands (authenticity information);

and brand logo data (authenticity information). Note that, as a matter of course, other types of information may be registered as object information and management information.

Figure 5:
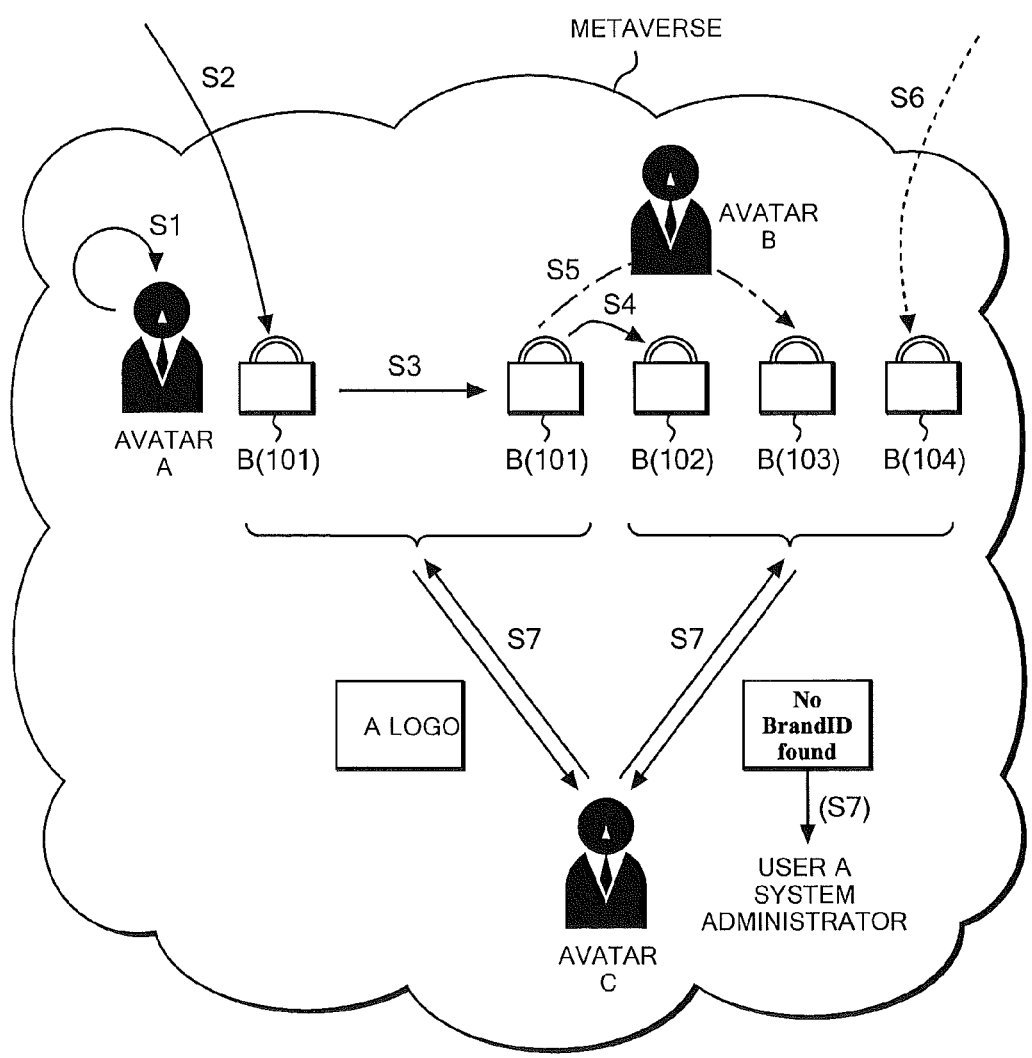
FIG. 5 is a conceptual diagram illustrating the genuine/fake determination of a bag object in the Metaverse, according to Example 1.

FIG. 5 is a conceptual diagram illustrating the genuine/fake determination of a bag object in the Metaverse, according to Example 1. Here, suppose that users A to C log in through respective clients 3A to 3C, and participate in the Metaverse as avatars A to C. Additionally, user A also manages brand A in the real world, and is the manufacturer and vendor (manager) of products (such as bags) of brand A. Avatar A is the manufacturer and vendor of product objects (including bag objects) of brand A in the Metaverse. Avatar B is a distributor of product objects (including bag objects) in the Metaverse. Avatar C is a consumer of product objects (such as bag objects) in the Metaverse. Hereinafter, a description will be given according to steps indicated by arrows S1 to S7.

(Brand Application)

Figure 6:
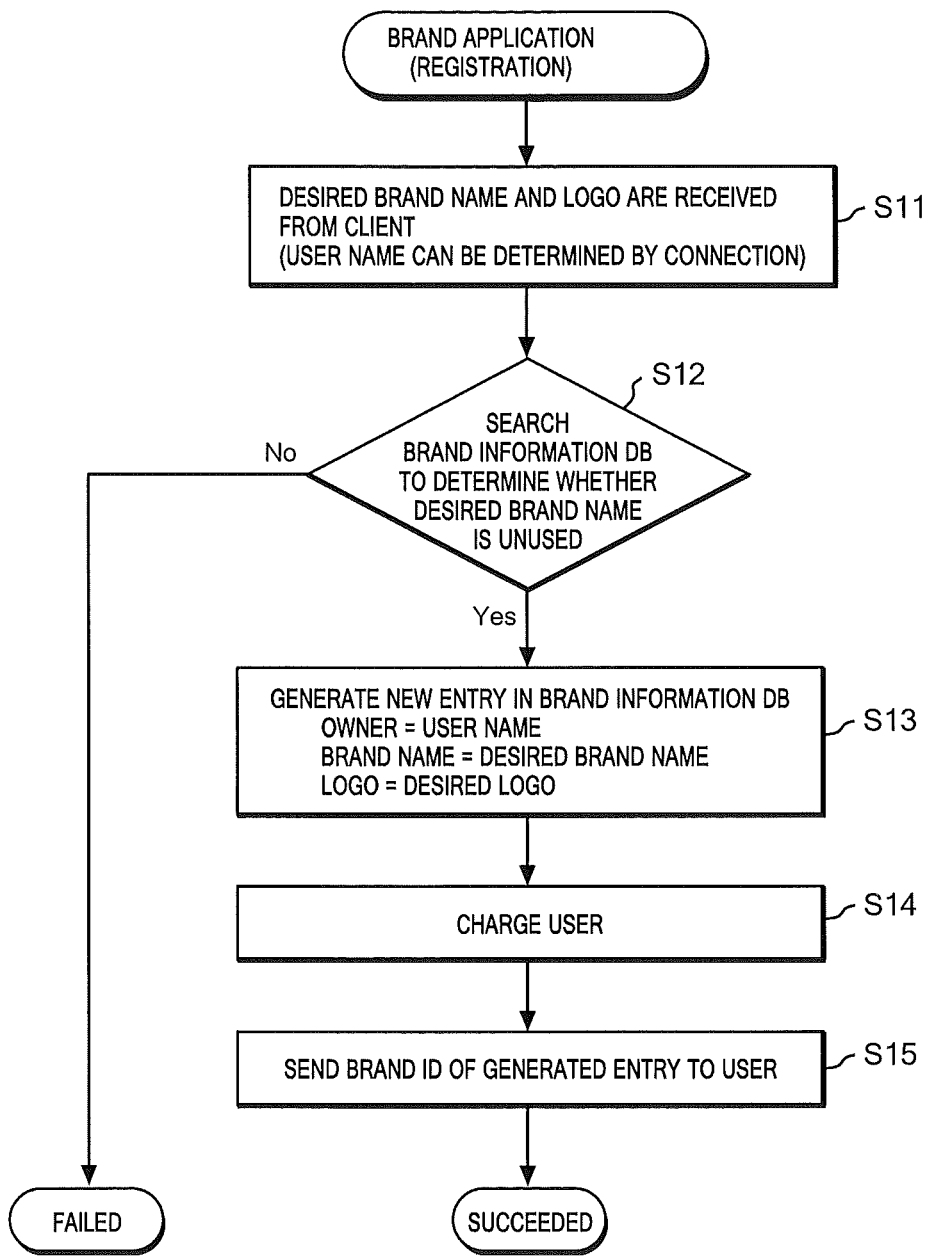
FIG. 6 is a flowchart for further explanation of step S1 in which user A applies for a brand.

FIG. 6 is a flowchart for explaining, in detail, a step indicated by an arrow S1 in FIG. 5, that is, step S1 in which user A applies for registration of a brand. The communication module 13 of the object management server 1C receives a brand application request from client 3A (step S11). The brand application request includes a brand name "A" and a logo "A logo" which user A wishes to register. Upon receipt of the brand application request, the registration module 14 of the brand management server 1C searches through the management database 12 to see whether the same brand name "A" is registered by users other than user A (any of users B to N) (step S12). As long as the brand name "A" is not registered by other users, the registration module 14 registers a new entry in the management database 12 (step S13). Meanwhile, user A is allowed to register a different logo (such as "a logo") for the same brand name "A". The minimum condition here for brand application is the brand name not being registered. Instead, since processing for brand application is not carried out frequently, a more severe examination may be carried out by the manager of the Metaverse. For instance, the manager may carry out an examination on whether user A holds the right (trademark right) of the applied brand name in the real world. In addition, when the registration application is permitted, the manager may charge user A for the right to use the brand in the Metaverse.

FIG. 7 is a schematic view of the management database 12 in the state where a new entry is registered. As shown in FIG. 7, "201" is registered as the brand ID, "user A" is registered as the manager information, "A" is registered as the name of the brand, and "A logo" is registered as the logo data. Incidentally, the brand ID "201" is a value unique to this entry, which is automatically assigned by the registration module 14 to every entry. The manager information "user A" is specified by a user ID and a password inputted by the user at the time of log-in to the Metaverse, and is provided by the login server 1A. Moreover, the registration module 14 charges user A (according to need) (step S14). Then, the registration module 14 transmits the brand ID "201" to client 3A through the communication module 13 (step S15).

(Brand Setting)

Figure 8:
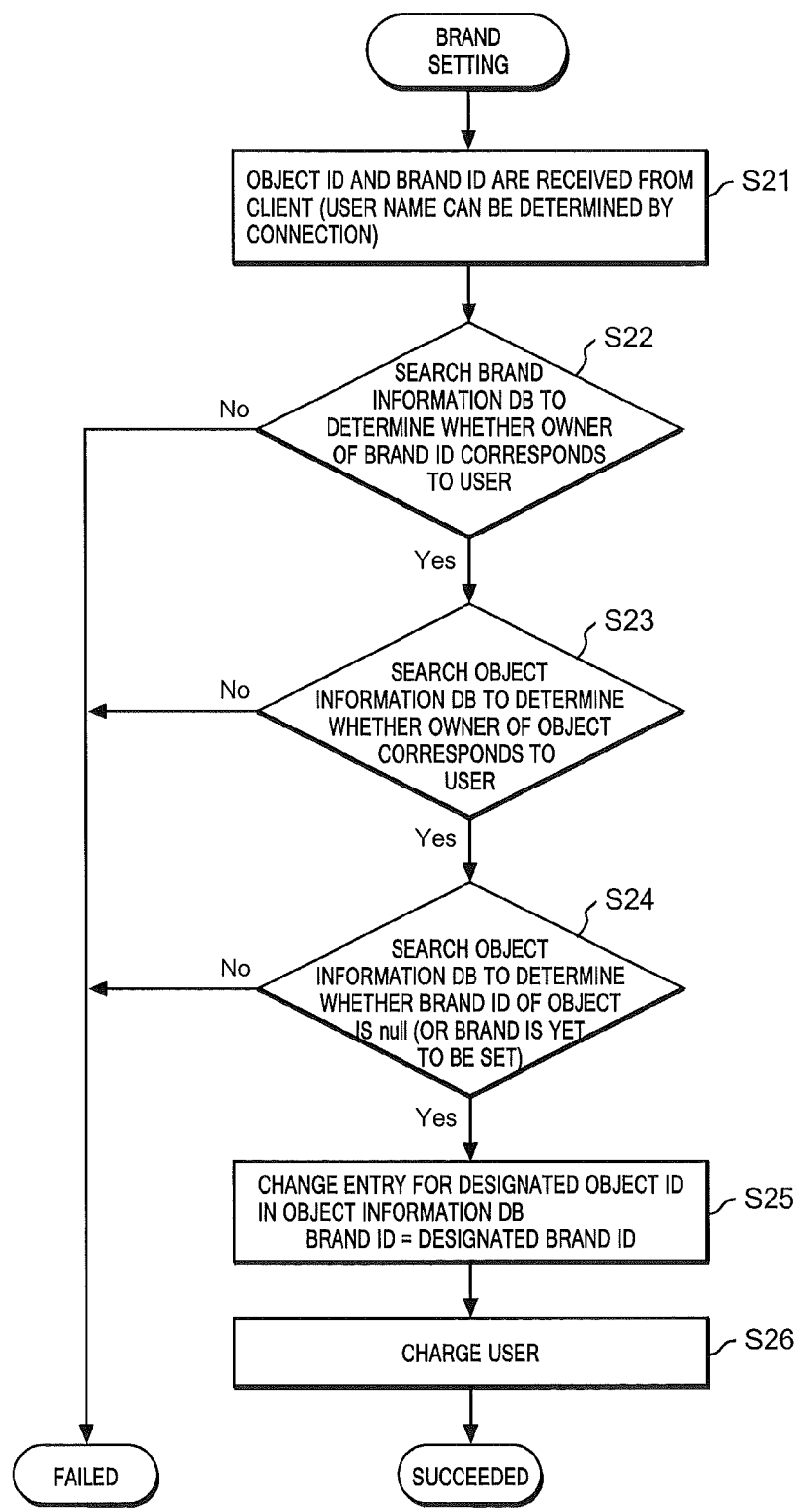
FIG. 8 is a flowchart for further explanation of step S2 in which user A carries out settings for the brand.

FIG. 8 is a flowchart for explaining, in detail, a step indicated by an arrow S2 in FIG. 5, that is, step S2 in which user A carries out settings for the brand. The communication module 13 of the object management server 1C receives a brand setting request from client 3A (step S21). The brand setting request includes an object ID "101" and a brand ID "201" respectively of the object and the brand which user A wishes to set. Incidentally, the brand ID "201" is given by the register module 14 to user A in the brand application previously made (step S1). Upon receipt of the brand setting request, the registration module 14 of the object management server 1C searches through the management database 12, and determines whether or not user A that transmitted the brand setting request coincides with the brand manager "user A" of the brand ID "201" (step S22). Note that, as mentioned above, the user that transmitted the brand setting request is specified at the time of log-in to the Metaverse. Next, the registration module 14 searches through the object database 11, and determines whether or not user A that transmitted the brand setting request coincides with the object owner "user A" of the object ID "101" (step S23), and determines thereafter whether or not the brand ID of the object ID "101" is yet to be set (null) (step S24). When all of these conditions (steps S22 to 24) are satisfied, the registration module 14 changes the brand ID of the entry for the received object ID from "null" to "201" (step S25). Additionally, the registration module 14 charges user A (according to need) (step S26).

Figure 9:
FIG. 9 is a schematic view of the object database 11 before and after the brand setting.

FIG. 9 is a schematic view of the object database 11 before and after brand setting is carried out. Entries for the object ID "101" before the brand setting include: form data "D (101)" of the bag object B (101); object owner information "user A" for specifying the owner of the bag object; history information "created by A" indicating the update history of the bag object B (101); and the brand ID "null" that points to management information of the bag object. Here, the history information "created by A" indicates that the form data "D (101)" was generated in the Metaverse or brought in from outside (the real world or another Metaverse) by user A. The brand ID "null" indicates that management information of the bag object B (101) is yet to be recorded. Meanwhile, after the brand setting, the brand ID of the entry for the object ID "101" is changed from "null" to "201". The brand ID "201" indicates the existence of management information entries (manager information "user A", name of brand "A", and logo data "A logo") specified by the brand ID "201" in the management database 12. No changes are made in the other entries: object ID "101", form data "D (101)", object owner information "user A", and history information "created by A". Incidentally, in response to the change in the brand ID from "null" to "201", "brand set to 201" may be added to the history information "created by A", to add the history of brand setting.

(Object Giving)

Figure 10:
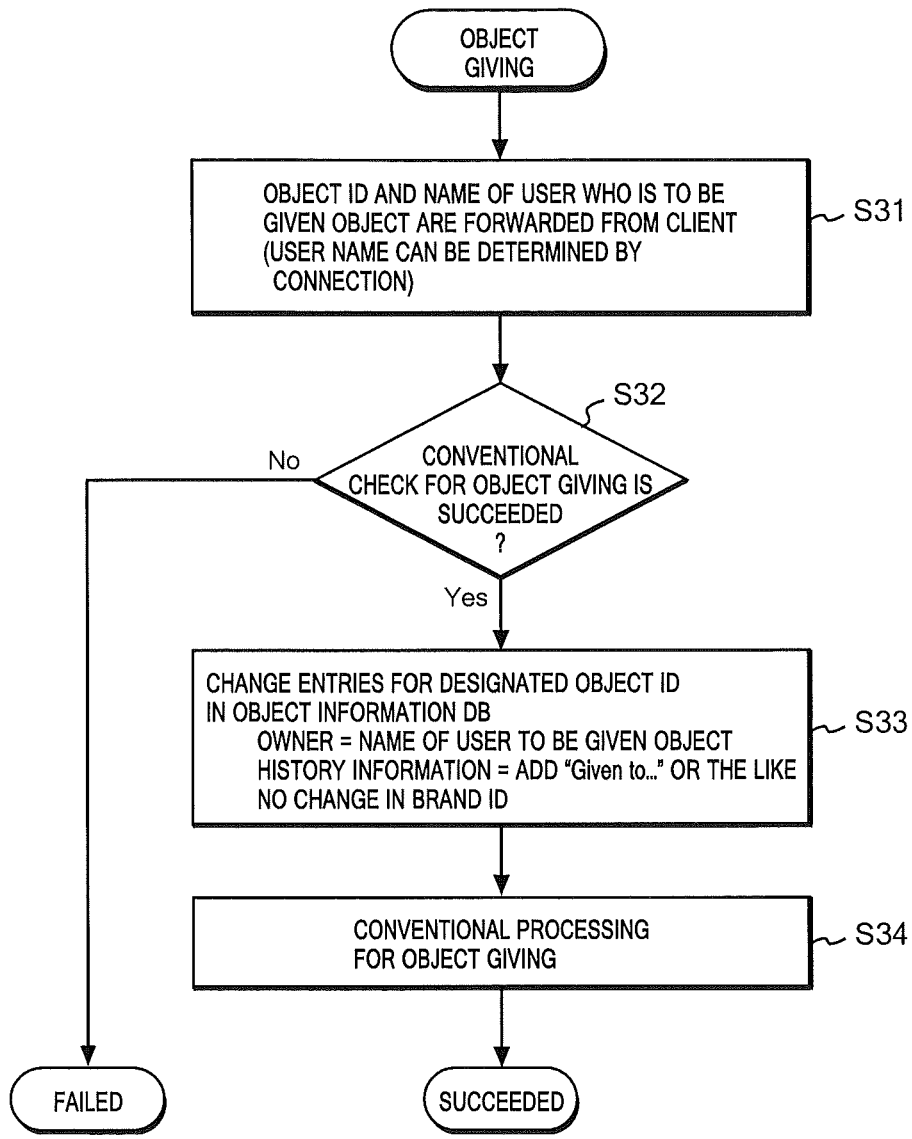
FIG. 10 is a flowchart for further explanation of step S3 of object giving.

FIG. 10 is a flowchart for explaining, in detail, a step indicated by an arrow S3 in FIG. 5, that is, the object giving step S3 in which the bag object B (101) is given from the user A to the user B. The communication module 13 of the object management server 1C receives an object giving request from client 3A (step S31). The object giving request includes an object ID "101" of the object which the user A wishes to give and a user name "user B" of a user to which the user A wishes to give the object. Upon receipt of the object giving request, the update module 15 of the object management server 1C carries out a conventional check for object giving (step S32). Then, the update module 15 changes, among the entries for the object ID "101" in the object database 11, an entry of the object owner information from "user A" to "user B", and additionally registers "given to B" to the history information "created by A" (step S33). Then, the update module 15 carries out a conventional processing for object giving (step S34).

FIG. 11 is a schematic view of the object database 11 before and after object giving. Entries for the object ID "101" before the object giving include: form data "D (101)" of the bag object B (101); object owner information "user A" for specifying the owner of the bag object B (101); history information "created by A" indicating the update history of the bag object B (101); and the brand ID "201" that points to management information of the bag object B (101). Meanwhile, after the user A gives the object to the user B, the object owner of the object ID "101" is changed from "user A" to "user B", and "given to B" is added to the history information. The history information "given to B" indicates that the object B (101) is given to user B. No changes are made in the other entries: object ID "101", form data "D (101)", and brand ID "201".

(Object Copying)

Figure 12:
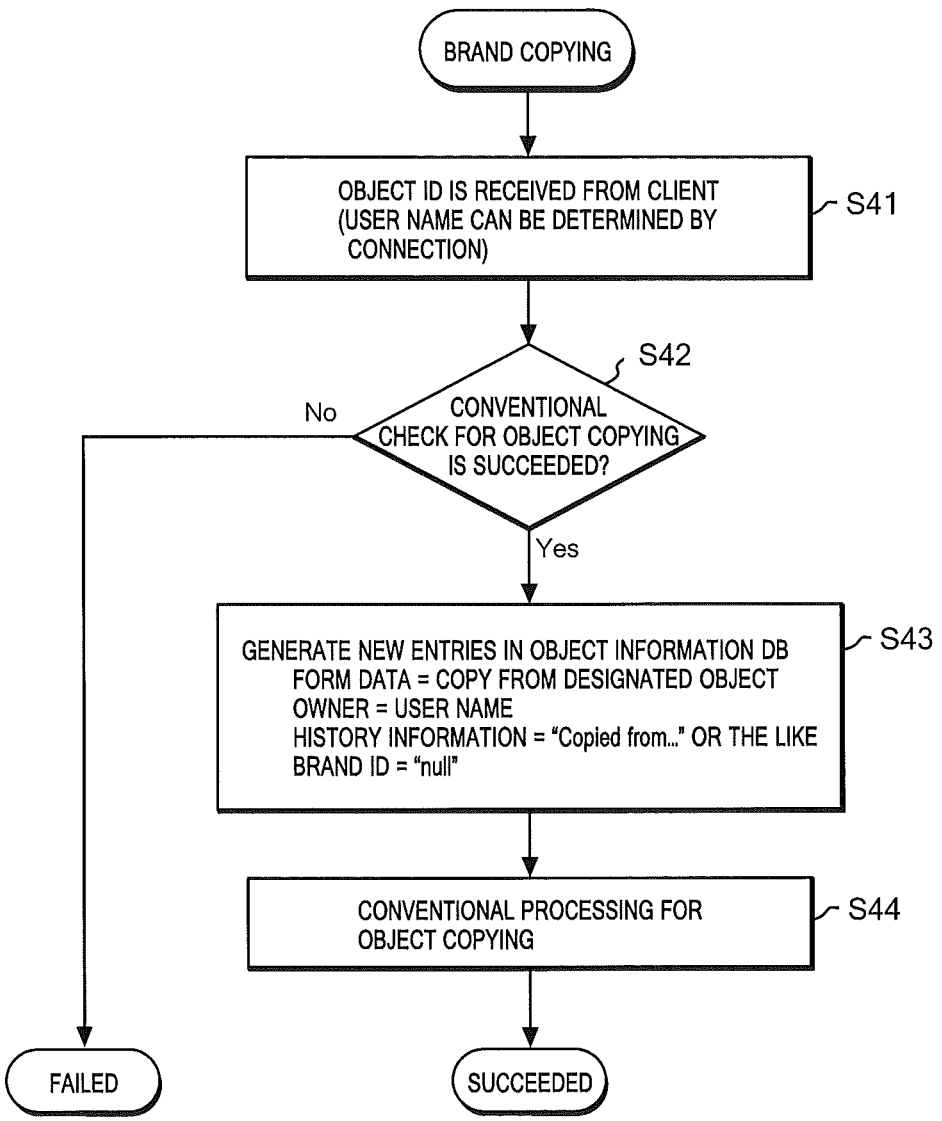
FIG. 12 is a flowchart for further explanation of step S4 of object copying.

FIG. 12 is a flowchart for explaining, in detail, a step indicated by an arrow S4 in FIG. 5, that is, the object copying step S4 in which user B copies the bag object B (101) to create a new bag object B (102). The communication module 13 of the object management server 1C receives an object copying request from client 3B (step S41). The object copying request includes an object ID "101" of the object that user B wishes to copy. Upon receipt of the object copying request, the update module 15 of the object management server 1C carries out a conventional check for object copying (step S42). Then, the update module 15 generates a new entry (such as object ID "102") in the object database 11 (step S43), and carries out a conventional processing for object copying (step S44).

Figure 13:
FIG. 13 is a schematic view of the object database 11 illustrating object copying, object modification, and object creation.

FIG. 13 is a schematic view of the object database 11 for explaining object copying, object modification (to be described later), and object creation (to be described later). As has been described, the entry of the object ID "101" indicates the bag object B (101) given from user A to user B. Entries for the object ID "102" include: form data D (101); object owner "user B"; history information "copied from ID (101)"; and brand ID "null". Here, the form data D (101) is copied from the entry for the object ID "101". The history information "copied from ID (101)" indicates that the form data of this entry (for the object ID "102") is copied from the object ID (101). Additionally, the brand ID "null" indicates that the brand ID has become invalid because the object has been copied.

(Object Modification)

Figure 14:
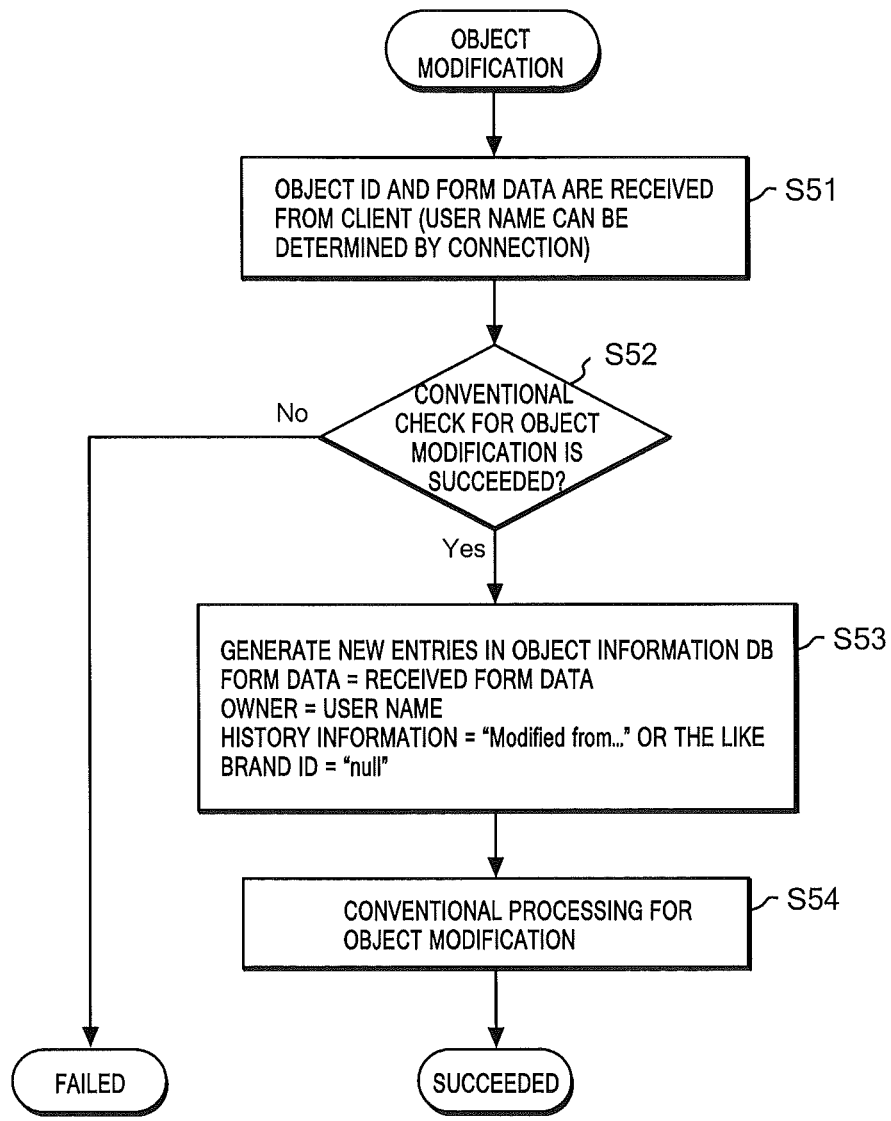
FIG. 14 is a flowchart for further explanation of step S5 of object modification.

FIG. 14 is a flowchart for explaining, in detail, a step indicated by a dashed line arrow S5 in FIG. 5, that is, the object modification step S5 in which user B creates a new bag object B (103) by modifying the bag object B (101). The communication module 13 of the object management server 1C receives an object modification request from client 3B (step S51). The object modification request includes an object ID "101" of the object before the modification by user B, and form data D (103) of the object after the modification. Upon receipt of the object modification request, the update module 15 of the object management server 1C carries out a conventional check for object modification (step S52). Then, the update module 15 creates a new entry (such as object ID "103") in the object database 11 (step S53), and carries out a conventional processing for object modification (step S54). Referring back to the schematic view of the object database 11 in FIG. 13, entries for the object ID "103" include: form data D (103); object owner "user B"; history information "modified from ID (101)"; and brand ID "null". Here, the form data D (103) is modified from the form data D (101) of the object ID "101". The history information "modified from ID (101)" indicates that the form data of this object (of the object ID "103") is modified from the form data of the object of the object ID "101". Additionally, the brand ID "null" indicates that the brand ID has become invalid because the object has been modified.

(Object Creation)

Figure 15:
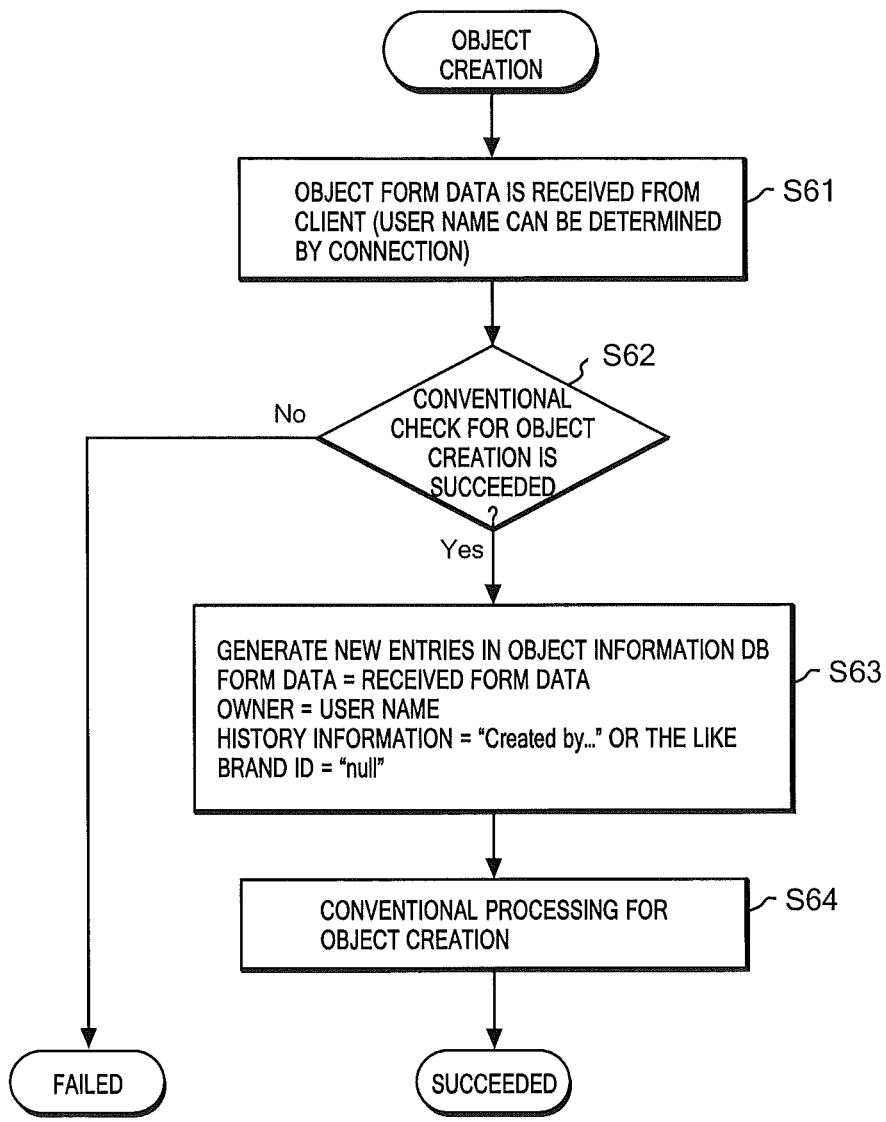
FIG. 15 is a flowchart for further explanation of step S6 of object creation.

FIG. 15 is a flowchart for explaining, in detail, a step indicated by a dashed line arrow S6 in FIG. 5, that is, the object creation step S6 in which user B creates a bag object B (104). The communication module 13 of the object management server 1C receives an object creation request from client 3B (step S61). The object creation request includes form data D (104) of the object that user B wishes to create. Upon receipt of the object creation request, the update module 15 of the object management server 1C carries out a conventional check for object creation (step S62). Then, the update module 15 creates a new entry (such as an object ID "104") in the object database 11 (step S63), and carries out a conventional processing for object creation (step S64). Referring back to the schematic view of the object database 11 in FIG. 13, entries for the object ID "104" include: form data D (104); object user "user B"; history information "created by user B"; and brand ID "null". The form data D (104) is created by user B. The history information "created by B" indicates that the form data D (104) is created in the Metaverse or brought in to the Metaverse from outside by user B. The brand ID "null" indicates that brand management information of the bag object B (104) is yet to be recorded. Thus, even if form data very similar to the "brand product" is brought in to the Metaverse from outside, not being assigned with a brand ID, it is possible to tell that the object is fake by making an object enquiry in the following manner.

(Object Enquiry)

Figure 16:
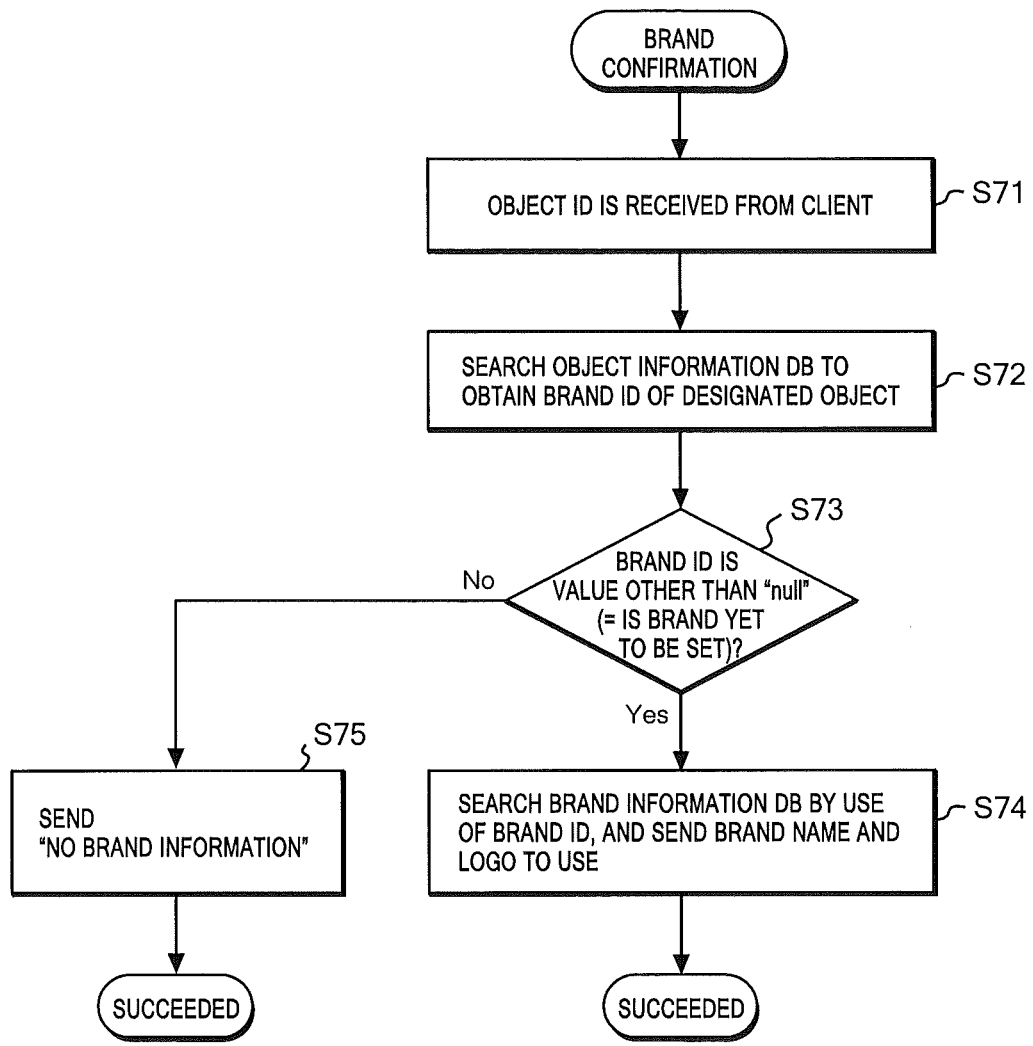
FIG. 16 is a flowchart for further explanation of step S6 of object enquiry.

FIG. 16 is a flowchart for explaining, in detail, a step indicated by an arrow S7 in FIG. 5, that is, the object enquiry step S7 in which user C makes enquiries for the bag objects B (101) to B (104). The communication module 13 of the object management server 1C receives an object enquiry request from client 3C (step S71). The object enquiry request includes an object ID of the bag object B for which user C wishes to make an enquiry. Upon receipt of the object enquiry request, the enquiry module 16 of the object management server 1C searches through the object database 11 and retrieves a brand ID of the entry for the received brand ID (step S72). The enquiry module 16 determines whether or not the brand ID is "null" (step S73). If the brand ID of the received object ID is not "null", the enquiry module 16 searches through the management database 12, and transmits the brand name and logo of the brand ID to client 3C (step S74). Meanwhile, if the corresponding brand ID is "null", the enquiry module 16 transmits a message indicating "no corresponding brand ID" to client 3C (step S75). Moreover, the enquiry module 16 may transmit an alert to a predetermined Metaverse administrator or concerned parties determined on the basis of history information.

More specifically, an object enquiry request is transmitted to the object management server 1C when user C clicks a bag object B in the Metaverse. If the bag object B is the bag object B (101), the brand ID is "201" instead of "null", and thus the enquiry module 16 searches through the management database 12 and transmits the brand name "A" and its logo "A logo" of the brand ID "201" to client 3C (step S74). The brand name "A" and logo "A logo" are displayed to be recognizable by at least avatar C in the Metaverse. The brand name and logo may be displayed to be recognizable also by other avatars A and B. Here, it should be noted that, if the bag object B clicked by avatar C is the bag object B (101), the brand name "A" and logo "A logo" are displayed, regardless of whether the bag object B (101) has been given or not (see FIG. 11), that is, whether the owner of the bag object B (101) is user A or user B.

In contrast, if the bag object B that avatar C clicks in the Metaverse is any of the bag objects B (102) to B (104), the corresponding brand ID is "null" (see FIG. 13), and thus the enquiry module 16 transmits a message indicating "no corresponding brand ID" to client 3C (step S74). The message is displayed to be recognizable by at least avatar C in the Metaverse. The message may be displayed to be recognizable also by other avatars A and B. The enquiry module 16 may also transmit a message indicating "no corresponding brand ID" to the administrator of the Metaverse in the form of a mail. In other words, when avatar C clicks the bag object B (102) or B (103), the bag object B (101) being the original of the copying or modification is specified by the history information "copied from ID (101)" or "modified from ID (101)" of the entry. Moreover, the creator of the original bag object B (101) is specified as "user A" by the history information "created by A" of the entry. As a result, the enquiry module 16 may transmit an alert message to user A, as a concerned party, that "the bag object B (102) (or B (103)) owned by user B is a copy or modification of the bag object B (101) created by user A". The alert message may otherwise be transmitted in response to an approval by user C. Here, note that the enquiry made by user C for the bag object B (102) or B (103) owned by avatar B allows transmission of an alert message to the original user A, who has no direct association with any of the avatars B and C or users B and C.

Although object owners and brand managers are specified by user names (such as "user A") in Example 1, these may also be specified by avatar names (such as "avatar A") in the Metaverse.

EXAMPLE 2

In Example 1, a case of determining whether a bag object in the Metaverse is genuine or fake has been described. In Example 2, a case of determining whether an employee badge object I in the Metaverse is genuine or fake will be described. FIG. 17 is a schematic view of the data structure of a management database 12 according to Example 2. As shown in FIG. 17, entries in the management database 12 include: corporate IDs (authenticity information) for specifying the companies, instead of brand IDs for specifying the brands; owner information (authenticity information) for specifying the owner of each employee badge object, instead of manager information for specifying the manager of each brand; company names showing names of the companies (authenticity information), instead of names of the brands; and company logo data (authenticity information) instead of the brand logo data.

A description will be given of an enquiry for the employee object I with reference to FIG. 16. A communication module 13 of the object management server 1C receives an object enquiry request from client 3C (step S71). The object enquiry request includes an object ID of the employee badge object I for which user C wishes to make an enquiry. Upon receipt of the object enquiry request, an enquiry module 16 of the object management server 1C searches through an object database 11, and retrieves the corporate ID of the entry for the received object ID (step S72). The enquiry module 16 determines whether or not the corporate ID is "null" (step S73). If the corresponding corporate ID is not "null", the enquiry module 16 searches through the management database 12, and transmits the company name and logo of the corporate ID to client 3C (step S74). Meanwhile, if the corresponding corporate ID is "null", the enquiry module 16 transmits a message indicating "no corresponding corporate ID" to client 3C (step S75). Since other processes are the same as Example 1, descriptions thereof are omitted. However, note that in this case, giving of an employee badge object to another need to be prohibited.

EXAMPLE 3

In Example 1, a case of determining whether a bag object in the Metaverse is genuine or fake has been described. In Example 3, a case of determining whether a ticket object T of an event held for a certain time period in the Metaverse is genuine or fake will be described. FIG. 18 is a schematic view of the data structure of a management database 12 according to Example 3. As shown in FIG. 18, entries in the management database 12 include: event IDs (authenticity information) for specifying the events instead of brand IDs for specifying the brands; sponsor information (authenticity information) for specifying the sponsor of each event instead of manager information for specifying the manager of each brand; event names showing names of the events (authenticity information) instead of names of the brands; event logo data (authenticity information) instead of the brand logo data; and period information indicating the valid period of the event.

A description will be given of an enquiry for the ticket object T with reference to FIG. 16. A communication module 13 of the object management server 1C receives an object enquiry request from client 3C (step S71). The object enquiry request includes an object ID of the ticket object T for which user C wishes to make an enquiry. Upon receipt of the object enquiry request, an enquiry module 16 of the object management server 1C searches through an object database 11, and retrieves the event ID of the entry for the received object ID (step S72). The enquiry module 16 determines whether or not the corporate ID is "null" (step S73). If the corresponding event ID is not "null", on condition that its expiration time has not come yet, the enquiry module 16 searches through the management database 12, and transmits the event name and logo of the event ID to client 3C (step S74).

In the case where the expiration time has not come yet, the enquiry module 16 notifies client 3C of the fact. Meanwhile, if the corresponding event ID is "null", the enquiry module 16 transmits a message indicating "no corresponding event ID" to client 3C (step S75). Since other processes are the same as Example 1, descriptions thereof are omitted.

Figure 19:
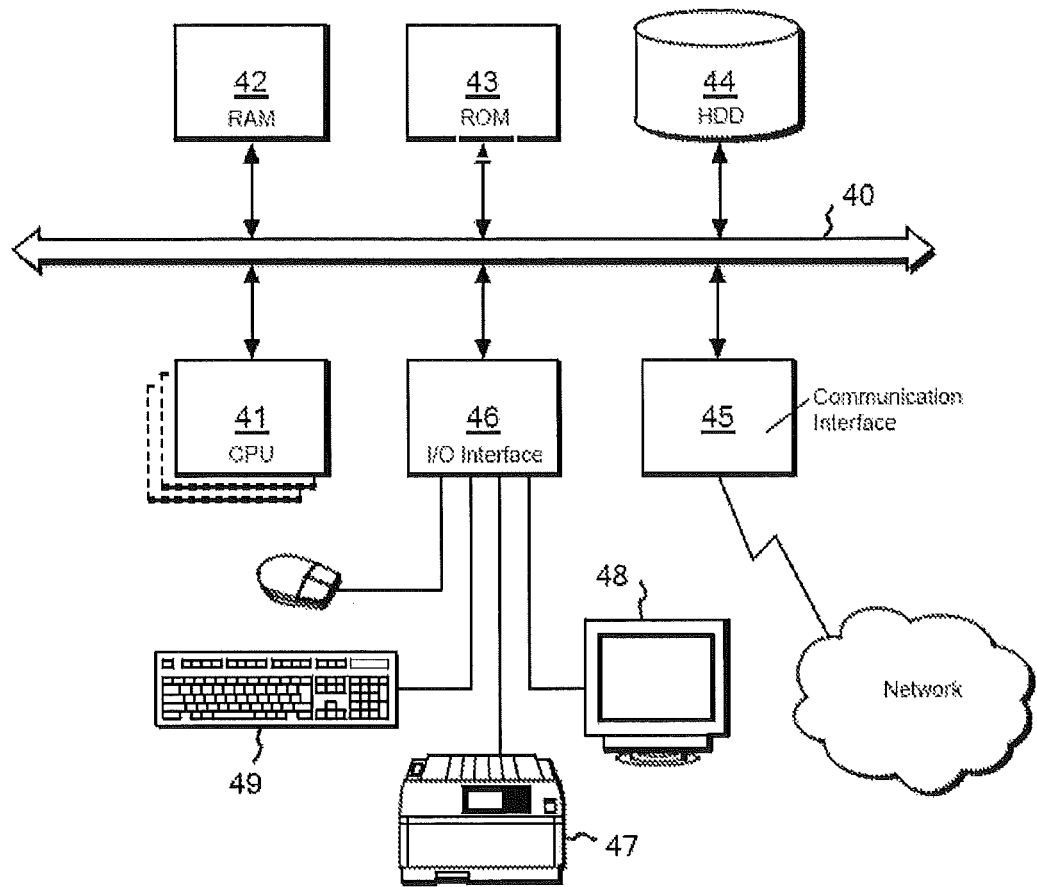
FIG. 19 is a schematic view illustrating a hardware configuration of the object management server 1C.

Hereinafter, descriptions will be given of a typical hardware and software configuration of the object management server 1C. FIG. 19 is a schematic view illustrating the hardware configuration of the object management server 1C. The object management server 1C includes a (high-speed/low-speed) bus 40, a CPU (central processing unit) 41 connected to the bus, a RAM (random access memory) 42, a ROM (read only memory) 43, an HDD (hard disk drive) 44, a communication interface 45, and an input/output interface 46. The object management server 1C further includes a printer 47, a display 48, a keyboard 49 and other devices connected to the input/output interface 46. Note that although personal computer architecture has been employed for the object management server 1C in the present embodiment, the CPU 41, the HDD 44 and the like may be multiplexed for higher data processing abilities and possibilities. Otherwise, multiple computers may be employed to implement the functions of the object management server 1C.

The software of the object management server 1C is configured of an OS (operating system) for providing basic functions, middleware such as database management software, and application software utilizing the functions of the OS and middleware. Each piece of software is loaded onto the RAM 42 and executed by the CPU 41. Functions shown in FIG. 2 can be implemented with this hardware and software configuration. To be specific, the function of the storage module is mainly implemented by cooperation of the HDD 44, the OS, and the database management software. Additionally, the functions of the registration module 14, the update module 15, and the enquiry module 16 are mainly implemented by cooperation of the OS, the database management software and the application software, and the function of the communication module 13 is mainly implemented by cooperation of the communication interface 45 and the OS.

The present embodiments enables determination of whether an object in a Metaverse is genuine or fake with a simple configuration, under the assumption that the objects are freely generated in the Metaverse and objects are freely brought in from outside by users. To be specific, even if an unauthorized copy of an object created by a user has exactly the same appearance as the original object in the Metaverse, the object does not hold authenticity information, and thus a third party can judge that the object is fake. Accordingly, the present embodiments are extremely advantageous as a countermeasure for fake objects of brand products, employee badges, tickets and the like which only make sense or become effective when shown to a third party.

Although some embodiments have been described in detail, it should be understood that various changes, substitutions and alternations can be made therein without departing from spirit and scope of the embodiments as defined by the appended claims.

What is claimed is:

1. A computer-implemented method of determining whether an object is genuine or fake in a Metaverse, the method being implemented in a computer system having one or more physical processors programmed with computer program instructions that, when executed by the one or more physical processors, cause the computer system to perform the method, the method comprising:
   causing, by the computer system a first entry to be stored in a data record, wherein the first entry comprises a first object ID and a first authenticity information, wherein the first object ID specifies a first object in the Metaverse accessible by avatars of users that access the Metaverse via client devices, wherein the first object is owned by a first user, and wherein the first authenticity information indicates that the first object is genuine;
   in response to the first object being copied to form a second object in the Metaverse, causing, using the computer system, the first entry to be copied to form a second entry in the data record, wherein the second entry co-exists with the first entry and includes a second object ID and a second authenticity information, wherein the second object ID specifies the second object in the Metaverse, and wherein the second authenticity information indicates that the second object is fake;
   receiving, by the computer system, from a client device, an enquiry request concerning the second object, the enquiry request including the second object ID;
   transmitting, by the computer system, the second authenticity information corresponding to the second object ID to the client device in response to the enquiry request; and
   transmitting, by the computer system, an alert notification to a first user client device associated with the first user in response to the enquiry request, the alert notification notifying the first user that the second object is a copy of the first object owned by the first user.

2. The method of claim 1, wherein:
the first object is an accessory object for avatars in the Metaverse; and
wherein the first authenticity information further includes one or more of manager information specifying a manager of a brand of the accessory object, a brand name indicating the name of a brand of the accessory object, or logo data indicating a logo of a brand of the accessory object.

3. The method of claim 1, wherein:
the first object is an employee badge object of an avatar in the Metaverse; and
wherein the first authenticity information further includes one or more of a company name associated with the employee badge object, or logo data indicating a logo of a company associated with the employee badge object.

4. The method of claim 1, wherein:
the first object is a ticket having an expiration time in the Metaverse; and
wherein the first authenticity information further includes time period information indicating an expiration time of the first authenticity information.

5. The method of claim 1, wherein an enquiry request is received responsive to a selection of the first object in the Metaverse.

6. A system for determining whether an object is genuine or fake in a Metaverse, the system comprising:
   one or more physical processors programmed with one or more computer program instructions which, when executed, cause the one or more physical processors to:
   store a first entry in a data record, wherein the first entry comprises a first object ID and a first authenticity information, wherein the first object ID specifies a first object in the Metaverse accessible by avatars of users that access the Metaverse via client devices, wherein the first object is owned by a first user, and wherein the first authenticity information indicates that the first object is genuine;
   in response to the first object being copied to form a second object in the Metaverse, cause the first entry to be copied to form a second entry in the data record, wherein the second entry co-exists with the first entry and includes a second object ID and a second authenticity information, wherein the second object ID specifies the second object in the Metaverse, and wherein the second authenticity information indicates that the second object is fake;
   receive, from a client device, an enquiry request concerning the second object, the enquiry request including the second object ID;
   transmit the second authenticity information corresponding to the second object ID to the client device in response to the enquiry request; and
   transmit an alert notification to a first user client device associated with the first user in response to the enquiry request, the alert notification notifying the first user that the second object is a copy of the first object owned by the first user.

7. The system of claim 6, wherein:
the first object is an accessory object for avatars in the Metaverse; and
wherein the first authenticity information further includes one or more of manager information specifying a manager of a brand of the accessory object, a brand name indicating the name of a brand of the accessory object, or logo data indicating a logo of a brand of the accessory object.

8. The system of claim 6, wherein:
the first object is an employee badge object of an avatar in the Metaverse; and
wherein the first authenticity information further includes one or more of a company name associated with the employee badge object, or logo data indicating a logo of a company associated with the employee badge object.

9. The system of claim 6, wherein:
the first object is a ticket having an expiration time in the Metaverse; and
wherein the first authenticity information further includes time period information indicating an expiration time of the first authenticity information.

10. The system of claim 6, wherein an enquiry request is received responsive to a selection of the first object in the Metaverse.

11. A computer program product for determining whether an object is genuine or fake in a Metaverse, the computer program product comprising:
one or more tangible, non-transitory computer-readable storage devices;
program instructions, stored on at least one of the one or more tangible, non-transitory computer-readable tangible storage devices that, when executed, cause a computer to:
store a first entry in a data record, wherein the first entry comprises a first object ID and a first authenticity information, wherein the first object ID specifies a first object in the Metaverse accessible by avatars of users that access the Metaverse via client devices, wherein the first object is owned by a first user, and wherein the first authenticity information indicates that the first object is genuine;
in response to the first object being copied to form a second object in the Metaverse, cause the first entry to be copied to form a second entry in the data record, wherein the second entry co-exists with the first entry and includes a second object ID and a second authenticity information, wherein the second object ID specifies the second object in the Metaverse, and wherein the second authenticity information indicates that the second object is fake;
receive, from a client device, an enquiry request concerning the second object, the enquiry request including the second object ID;
transmit the second authenticity information corresponding to the second object ID to the client device in response to the enquiry request; and
transmit an alert notification to a first user client device associated with the first user in response to the enquiry request, the alert notification notifying the first user that the second object is a copy of the first object owned by the first user.

* * * * *